United States Patent
Khachaturov

(10) Patent No.: US 12,510,712 B2
(45) Date of Patent: Dec. 30, 2025

(54) MEDICAL OPTICAL FIBER WITH PROTECTIVE TIP ENCAPSULATION

(71) Applicant: LUMENIS LTD., Yokneam (IL)

(72) Inventor: Arkady Khachaturov, Haifa (IL)

(73) Assignee: Lumenis Ltd., Yokneam Ilit (IL)

( * ) Notice: Subject to any disclaimer, the term of this patent is extended or adjusted under 35 U.S.C. 154(b) by 182 days.

(21) Appl. No.: 17/727,014

(22) Filed: Apr. 22, 2022

(65) Prior Publication Data

US 2022/0342152 A1    Oct. 27, 2022

Related U.S. Application Data

(60) Provisional application No. 63/179,487, filed on Apr. 25, 2021.

(51) Int. Cl.
*G02B 6/26* (2006.01)
*A61B 18/22* (2006.01)
*A61N 5/06* (2006.01)

(52) U.S. Cl.
CPC ...... *G02B 6/262* (2013.01); *A61B 2018/2285* (2017.05); *A61B 2018/2288* (2013.01); *A61N 5/0601* (2013.01); *A61N 2005/063* (2013.01)

(58) Field of Classification Search
CPC ............ G02B 6/262; A61B 2018/2285; A61B 2018/2288; A61B 2018/2255; A61B 2018/2261; A61B 2018/2266; A61B 2018/2277; A61B 2018/2286; A61B 1/0017; A61B 1/07; A61B 1/00163; A61B 1/00165; A61B 1/00167; A61B 2090/306; A61B 2090/3614; A61B 2565/18

See application file for complete search history.

(56) References Cited

U.S. PATENT DOCUMENTS

| | | | |
|---|---|---|---|
| 11,446,087 B2* | 9/2022 | Waisman | G02B 6/4486 |
| 2007/0248307 A1* | 10/2007 | Page | G02B 6/0065 |
| | | | 65/392 |
| 2008/0021276 A1* | 1/2008 | Wax | A61B 1/00142 |
| | | | 600/122 |
| 2010/0222668 A1* | 9/2010 | Dalke | A61P 35/00 |
| | | | 600/4 |
| 2014/0254996 A1* | 9/2014 | Khachaturov | A61B 18/22 |
| | | | 385/109 |
| 2019/0314086 A1* | 10/2019 | Waisman | G02B 6/443 |
| 2022/0409277 A1* | 12/2022 | Khachaturov | G02B 6/443 |

FOREIGN PATENT DOCUMENTS

CN    111948757 A    11/2020

OTHER PUBLICATIONS

International Search Report and Written Opinion dated Jul. 4, 2022 for International Application No. PCT/IB2022/053791.

* cited by examiner

*Primary Examiner* — Thomas A Hollweg
*Assistant Examiner* — Kirsten D. Endresen
(74) *Attorney, Agent, or Firm* — Seager, Tufte & Wickhem, LLP

(57) ABSTRACT

The present disclosure provides a medical optical fiber with protective tips for use with medical laser-based treatment of internal bodily organs. The medical optical fibers have apertures in a jacket of the medical optical fiber to increase an adhesion between the protective tip and the jacket.

20 Claims, 5 Drawing Sheets

MEDICAL OPTICAL FIBER WITH PROTECTIVE TIP ENCAPSULATION

CROSS-REFERENCE TO RELATED APPLICATIONS

This application claims the benefit of U.S. Provisional Application Ser. No. 63/179,487 filed Apr. 25, 2021, entitled "Medical Optical Fiber with Protective Tip Encapsulation," which application is incorporated herein by reference in its entirety.

BACKGROUND

Medical optical fibers typically include an optical fiber and a jacket surrounding the optical fiber. Optical fibers may comprise an innermost optical core and optionally a cladding layer surrounding the optical core. Some optical fibers can optionally include a mechanical support layer surrounding the cladding layer. Additionally, medical optical fibers often include jackets (or protective layers), and many have portions of their jackets stripped at a distal end. For example, like electrical wires, optical fibers can be stripped to expose a core of the optical fiber at a distal end. Medical optical fiber diameters are in the range of a few tens of microns to a few hundreds of microns. Due to this small diameter, the distal section of the medical optical fiber can be sharp or pointed.

Some medical optical fibers include a smooth tip disposed on a distal end for assisting in passage through an endoscope. Such tip additions are designed to shatter, fragment, melt, or otherwise be destroyed, when laser pulses are activated to expose the optical fiber core. Some tips provide mechanical strength to the medical optical fiber. However, adhesion between the tip and the jacket can result in the tip coming loose or falling off between manufacturing and use.

BRIEF SUMMARY

The present disclosure provides a medical optical fiber comprising an optical fiber disposed along a longitudinal axis. The medical optical fiber further includes an optical fiber tip disposed on a distal end of the medical optical fiber where the distal end of the medical optical fiber comprises an optical fiber tip having an optical fiber end face transverse to the longitudinal axis. Additionally, the optical fiber includes an innermost optical core having an optical core end face central to the optical fiber end face. The medical optical fiber further includes a jacket surrounding the optical fiber where the jacket has a distal jacket face end transverse to the longitudinal axis and the jacket comprises at least one aperture.

Further provided herein is a protective tip encapsulating the optical fiber end face and the jacket end face, which overlaps with several aperture(s). In some embodiments, the protective tip substantially contacts an inner surface of the number of aperture(s) to provide higher adhesion of the protective tip to the medical optical fiber.

With some embodiments, the number of aperture(s) is any depth up to and including a full depth of the jacket. The aperture(s) of the medical optical fiber can be any geometric shape or volume. The number of aperture(s) of the medical optical fiber can comprise aperture sidewalls and the aperture sidewalls can be any geometric shape. Additionally, the number of aperture(s) of the medical optical fiber can comprise a volume of any geometric volume.

In some embodiments, the medical optical fiber comprises multiple apertures and each of the apertures is a different depth in the jacket and/or a different geometric shape. With some embodiments, an aperture of the multiple apertures is co-directional with the longitudinal axis. The aperture of the medical optical fiber can extend from the jacket end face. With other embodiments, the aperture of the medical optical fiber is transverse to the longitudinal axis.

In some embodiments, the protective tip is made of material that absorbs laser energy and one or more of fragments or melts, wherein on delivery of laser energy through the medical optical fiber, at least some of said leading protective tip surface forward of said optical fiber end face fragments or melts for enabling delivery of laser energy through said optical core end face to an internal bodily organ.

BRIEF DESCRIPTION OF THE SEVERAL VIEWS OF THE DRAWINGS

To easily identify the discussion of any element or act, the most significant digit or digits in a reference number refer to the figure number in which that element is first introduced.

DETAILED DESCRIPTION

Figure 1:
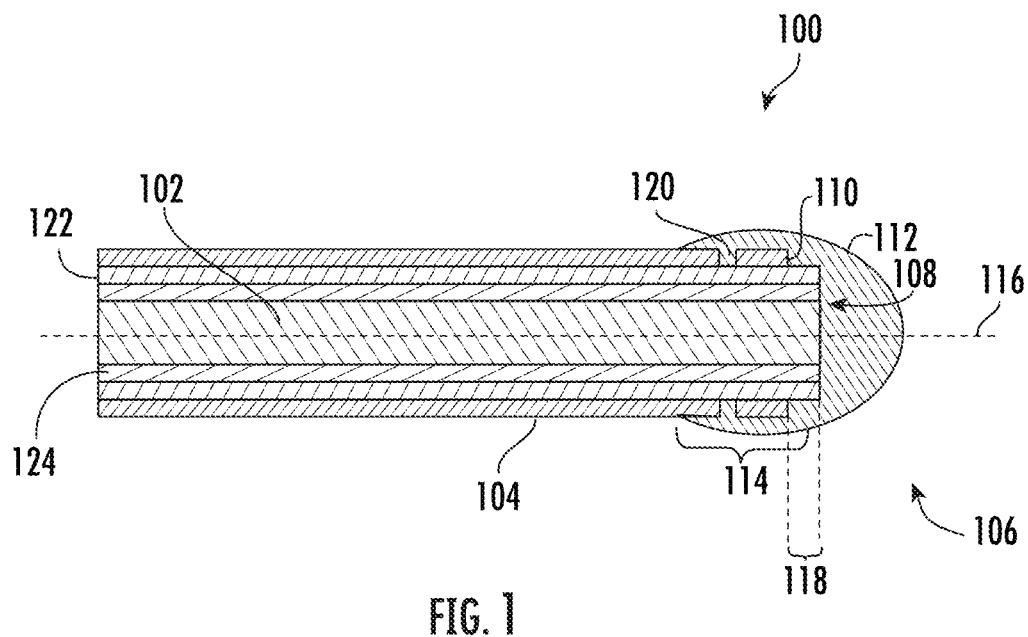
FIG. 1 illustrates a medical optical fiber in accordance with at least one embodiment.

FIG. 1 illustrates a medical optical fiber 100 having an optical fiber 102 and a jacket 104. The optical fiber 102 has an end face 108 while the jacket 104 has an end face 110, each at a distal end 106 of the medical optical fiber 100. The medical optical fiber 100 additionally includes a protective tip 112 having a trailing protective tip surface 114 disposed on the distal end 106 of the medical optical fiber 100. With some embodiments, the protective tip 112 overlaps a part of the jacket 104 at the distal end 106. In particular, the protective tip 112 covers the jacket 104 and the end face 110 and overlaps a portion of the jacket 104 to protect the end faces.

The end face 110 of the jacket 104 is spaced apart from the end face 108 of the optical fiber 102 along longitudinal axis 116 by a length L1 118. In some embodiments, length L1 118 is between about 400 and 500 micrometers (m). In general, protective tip 112 can be manufactured and/or provided on medical optical fiber 100 using any of a variety of conventional manufacturing techniques, which do not militate against their construction or operation. Such conventional manufacturing techniques include, but are not limited to, gluing, curing, and the like.

The jacket 104 includes an aperture 120. The aperture 120 may be formed in a wide range of shapes and orientations. In some embodiments, the aperture 120 comprises one or more grooves that are transverse to the longitudinal axis 116 or rather, that extend radially around the medical optical fiber 100 when viewed from the distal end 106. In some examples, jacket 104 can includes multiple apertures 120. The multiple aperture 120 can be the same or different shapes or volumes. Further, the apertures 120 can be formed to a variety of depths in jacket 104.

In some embodiments, the apertures 120 in the jacket 104 may be prepared by steps that include but are not limited to, chemical etching, laser etching, physically stripping, or any combination thereof. In some embodiments, the jacket 104 peripheral surface is prepared (e.g., scratched, sanded, or the like) to present a surface with higher adhesion capabilities. Some jacket materials, for example, Teflon, have a low adhesion capability.

With some embodiments, the medical optical fiber 100 further comprises a cladding layer 124 and a mechanical support layer 122. In some embodiments, protective tip 112 is mounted on the medical optical fiber 100 through at least one aperture 120. That is, the protective tip 112 attaches and contacts the mechanical support layer 122 through aperture 120. In some embodiments, apertures 120 may be made through a mechanical support layer 122 such that cladding layer 124 is exposed. In such an embodiment, the protective tip 112 attaches and contacts the cladding layer 124 through aperture 120. Contact of protective tip material on the mechanical support layer 122 and/or the cladding layer 124 may have greater adhesive strength than contact on the jacket 104 alone.

Figure 2A:
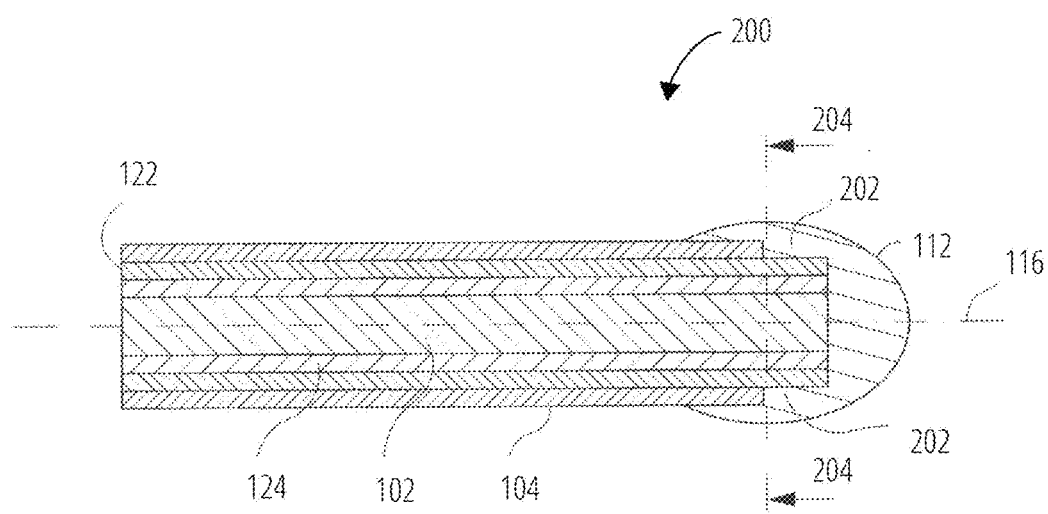
FIG. 2A illustrates another medical optical fiber in accordance with at least one embodiment.
Figure 2B:
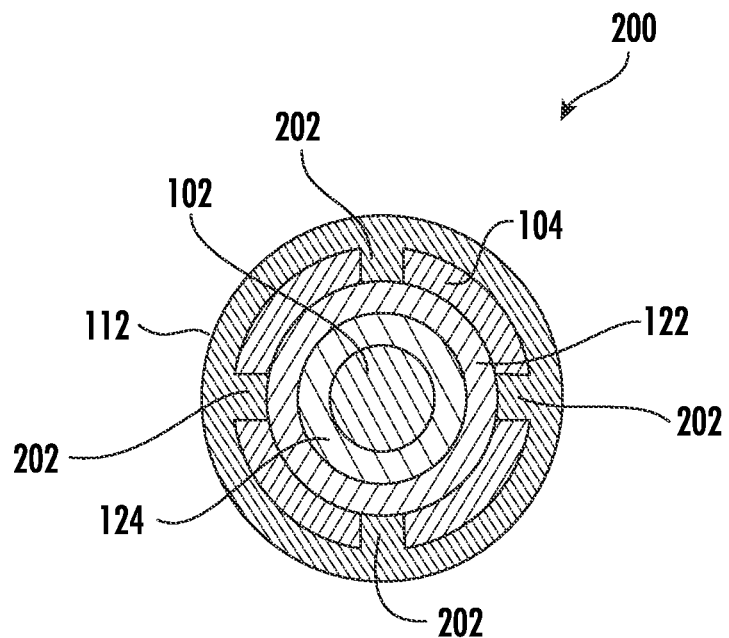
FIG. 2B illustrates an alternative view of the medical optical fiber of FIG. 2A.

FIG. 2A and FIG. 2B illustrate a medical optical fiber 200, which can include similar elements to the elements of medical optical fiber 100 depicted in FIG. 1. However, medical optical fiber 200 differs from medical optical fiber 100 in that the medical optical fiber 200 includes grooves 202 formed in jacket 104. The grooves 202 extend along the longitudinal axis 116 from distal end 106. The grooves 202 may be arranged to expose the mechanical support layer 122 and/or the mechanical support cladding layer 124. In some examples, a single groove 202 is provided. In other examples, multiple grooves 202 are provided.

The protective tip 112 is disposed over the distal end 106 of the medical optical fiber 200 and overlaps a portion of the jacket 104 such that the protective tip 112 overlaps or covers the grooves 202. For example, FIG. 2B illustrates a cut-away view from the distal end 106 along cut line 204. As can be seen, the protective tip 112 contacts the mechanical support layer 122 via groove 202 to provide connection of protective tip 112 to jacket 104.

Figure 3:
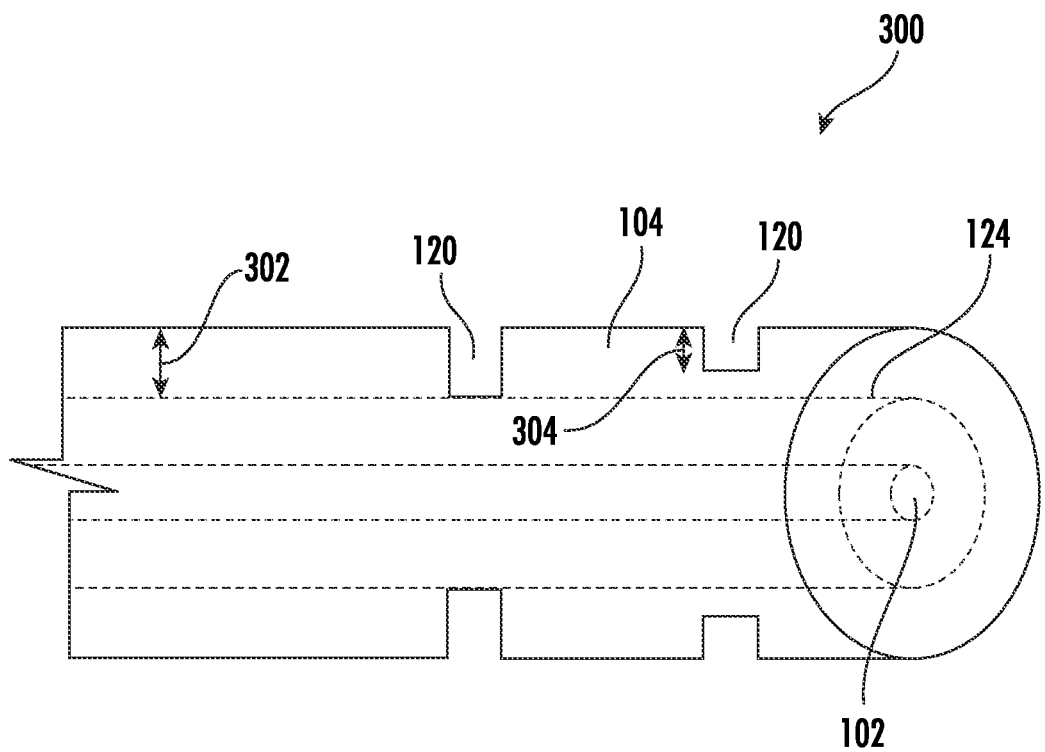
FIG. 3 illustrates another medical optical fiber in accordance with at least one embodiment.

FIG. 3 illustrates a medical optical fiber 300 comprising optical fiber 102, cladding layer 124, and jacket 104. The medical optical fiber 300 additionally includes multiple apertures 120 formed in different locations along jacket 104. As noted above, apertures 120 can be formed radially around medical optical fiber 300. Additionally, the apertures 120 can have different depths. For example, depth D1 302 and depth D2 304, which are different, are shown. With some embodiments, multiple apertures 120 can have the same depth while another aperture 120 or other apertures 120 can have different depths. In some embodiments, one or more of apertures 120 is formed to a depth D1 302 to reach or touch the cladding layer 124 while one or more other apertures 120 are formed to a depth D2 304 that does not reach or touch the cladding layer 124.

Figure 4:
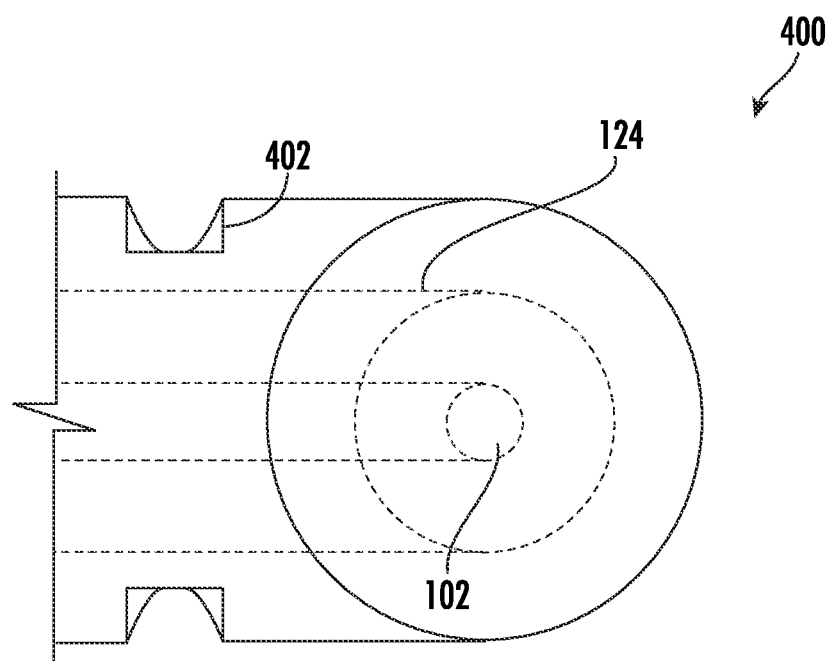
FIG. 4 illustrates another medical optical fiber in accordance with at least one embodiment.

With some embodiments, the aperture 120 can have sidewalls of different shapes or configurations. For example, FIG. 4 illustrates a medical optical fiber 400 comprising optical fiber 102, cladding layer 124, jacket 104, and aperture 120 formed in jacket 104. The aperture 120 has sidewalls 402 that can have various shapes. As a specific example, sidewall 402 can be curved. As another example, the sidewalls 402 can be undercut such that the aperture 120 is wider at the bottom of the aperture 120 than at the top of the aperture 120.

Figure 5:
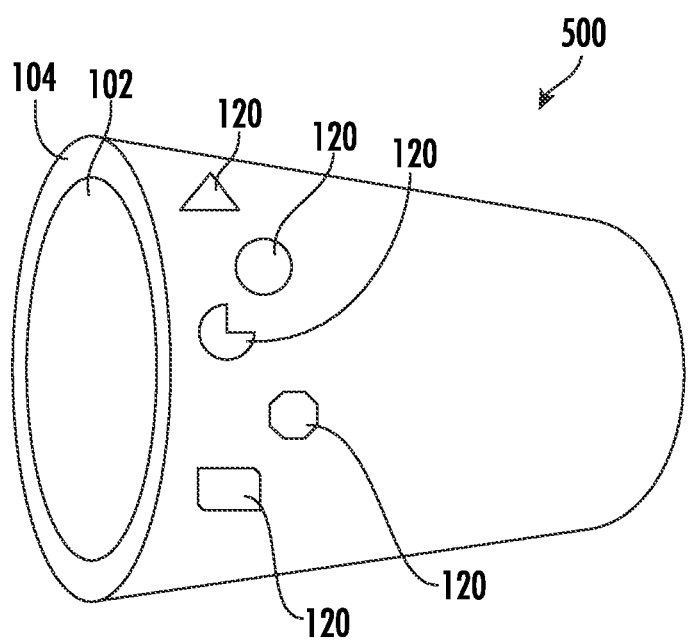
FIG. 5 illustrates another medical optical fiber in accordance with at least one embodiment.

FIG. 5 illustrates a medical optical fiber 500 showing a jacket 104 surrounding an optical fiber 102. The medical optical fiber 500 further includes multiple apertures 120 formed in jacket 104. In this, example, the apertures 120 are formed such that the apertures have different geometric shapes. Although not specifically depicted in this figure, the apertures 120 can have different depths or volumes. Furthermore, although each of the apertures 120 are shown as different geometric shapes, the apertures 120 can have the same geometric shape or some combination of same and different geometric shapes.

Figure 6A:
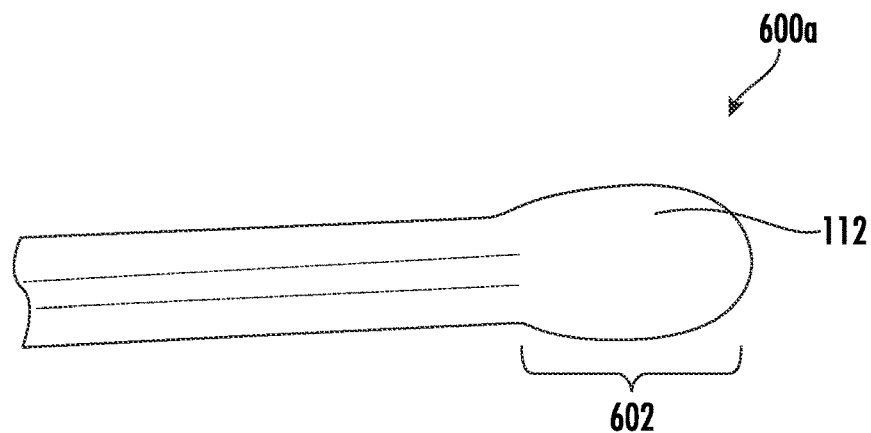
FIG. 6A illustrates another medical optical fiber in accordance with at least one embodiment.
Figure 6B:
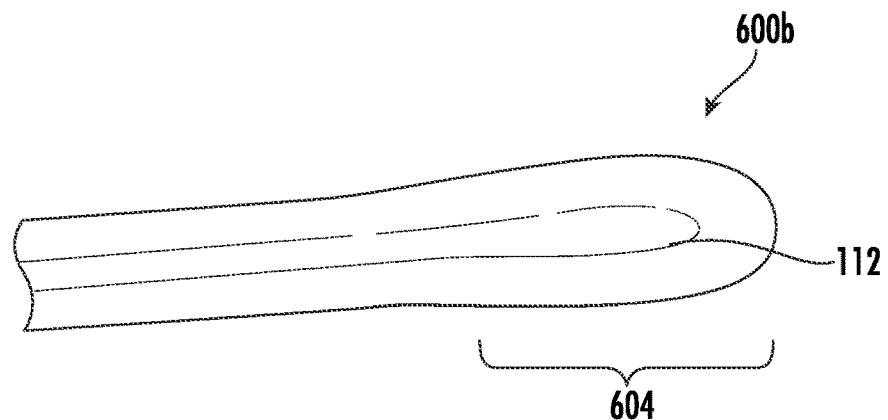
FIG. 6B illustrates another medical optical fiber in accordance with at least one embodiment.

FIG. 6A and FIG. 6B illustrate medical optical fiber 600a and medical optical fiber 600b, respectively. The medical optical fiber 600a and medical optical fiber 600b are depicted with protective tip 112 having different elongated spherical shapes. In general, the protective tip 112 can be formed to have any of a variety of lengths. For example, the medical optical fiber 600a depicted in FIG. 6A shows a protective tip 112 having a length L2 602 while the medical optical fiber 600b depicted in FIG. 6B shows a protective tip 112 having a length L3 604, which is longer than the length L2 602.

With some examples, the length of the protective tip 112 can be arranged such that the protective tip 112 extends from the distal end 106 towards the proximal end enough to cover or overlap with the apertures 120 in the jacket 104.

Figure 7:
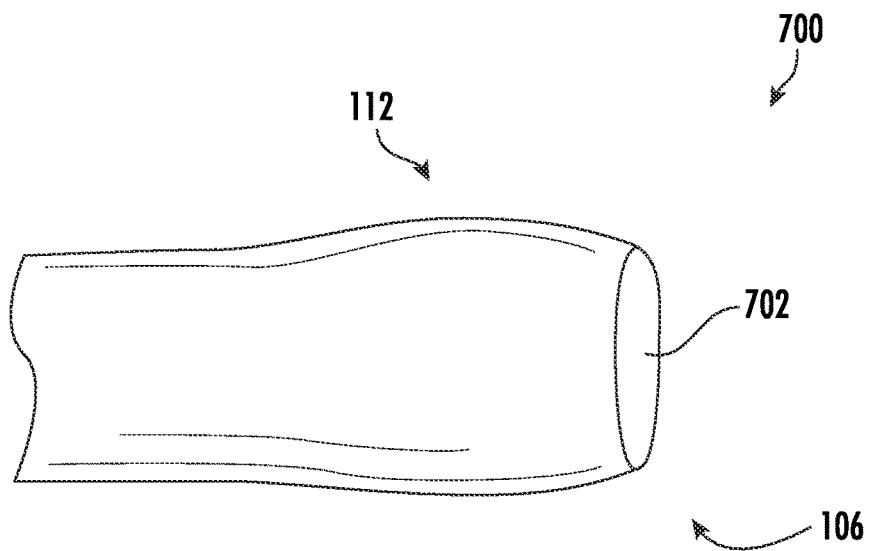
FIG. 7 illustrates another medical optical fiber in accordance with at least one embodiment.

FIG. 7 illustrates medical optical fiber 700. The medical optical fiber 700 includes protective tip 112 formed at a distal end 106 of the medical optical fiber 700. Additionally, protective tip 112 includes a blunt distal portion 702. In some embodiments, the distal end 106 of protective tip 112 can be flattened or blunted to form 702. With some specific embodiments, blunt distal portion 702 is flattened to be between 100 and 150 micrometers away from the end face 108 of optical fiber 102. An advantage of the blunt distal portion 702 is an increase in predictability of the output of laser radiation from the end face 108 of optical fiber 102. For example, with other embodiments discussed herein the first few pulses of laser radiation open or form a passage through protective tip 112 whereas with blunt distal portion 702 the passage is opened in a shorter time with less laser radiation needed to open the passage.

Figure 8:
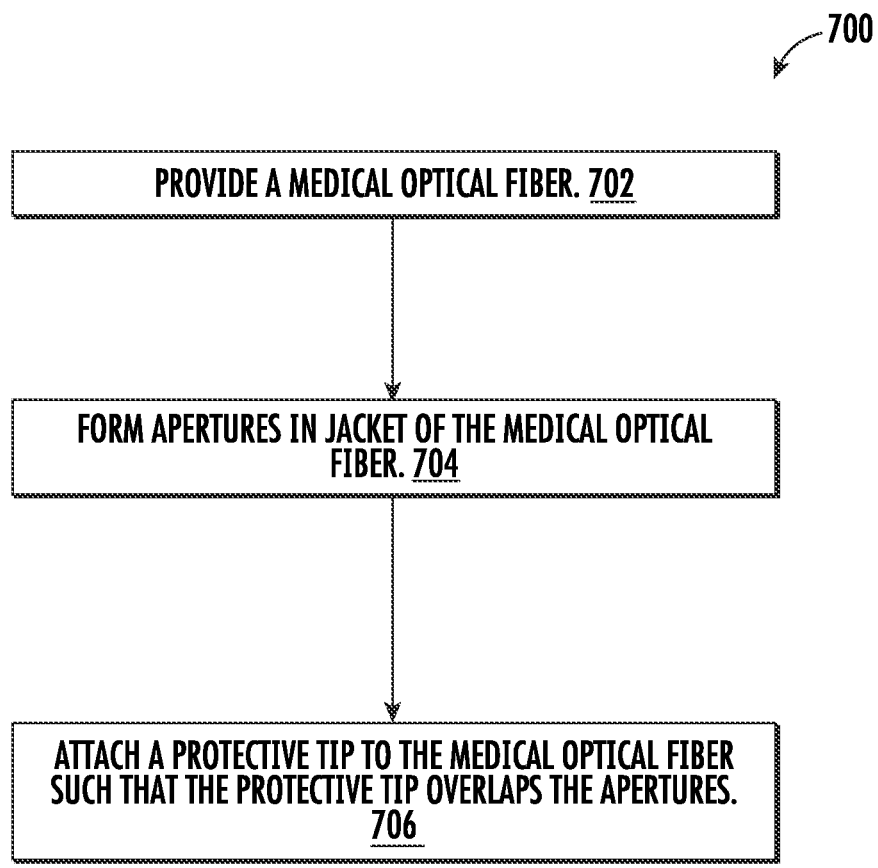
FIG. 8 illustrates a method of manufacture in accordance with at least one embodiment.

FIG. 8 illustrates a method 800 of manufacturing a medical optical fiber. The method 800 can be implemented to manufacture medical optical fibers like the medical optical fiber 100, medical optical fiber 200, medical optical fiber 300, medical optical fiber 400, medical optical fiber 500, medical optical fiber 600a, and medical optical fiber 600b shown herein. Method 800 can begin at block 802. At block 802 "provide a medical optical fiber" a medical optical fiber can be provided. With some examples, the provided medical optical fiber can have an optical fiber 102 surrounded or enclosed by a jacket 104. The provided medical optical fiber may further have a mechanical support layer 122, and/or a cladding layer 124. The optical fiber 102 and jacket 104 have end faces (e.g., end face 108 and end face 110, respectively) formed at a distal end 106 of the provided medial optical fiber.

Continuing to block 804 "form apertures in a jacket of the medical optical fiber" apertures are formed in a jacket of the provided medical optical fiber. For example, apertures 120 can be formed in the jacket 104 proximate to the end faces 110 or the distal end 106. The apertures 120 can be formed by laser etching, acid etching, cutting, grinding, or the like.

Continuing to block 806 "attach a protective tip to the medical optical fiber such that the protective tip overlaps the apertures" a protective tip overlapping the apertures can be attached to the medical optical fiber. For example, protective tip 112 can be attached to the distal end 106 of the medical optical fiber such that the protective tip 112 overlaps or covers the apertures 120. With some embodiments, the protective tip 112 completely covers and fills the apertures 120.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

While the presented concepts have been described with respect to a limited number of embodiments, it will be appreciated that many variations, modifications, and other applications of the disclosure can be implemented without departing from the scope of the appended claims.

What is claimed is:

1. A medical optical fiber, comprising:
    an optical fiber core comprising an optical fiber end face at a distal end of the medical optical fiber;
    a jacket surrounding the optical fiber core;
    at least one aperture disposed in the jacket; and
    a protective tip encapsulating the optical fiber end face and extending longitudinally from the distal end towards a proximate end of the medical optical fiber,
    wherein the protective tip overlaps with the at least one aperture, and
    wherein the protective tip comprises a flattened distal end configured to shatter, fragment, melt, or otherwise open a pathway responsive to laser energy.

2. The medical optical fiber of claim 1, wherein the protective tip substantially contacts an inner surface of the at least one aperture to increase an adhesion between the protective tip and the jacket.

3. The medical optical fiber of claim 1, comprising a cladding layer disposed between the optical fiber core and the jacket.

4. The medical optical fiber of claim 1, wherein the at least one aperture comprised a depth that is greater than or equal to a width of the jacket.

5. The medical optical fiber of claim 1, wherein the at least one aperture comprises a radial ring around the jacket.

6. The medical optical fiber of claim 1, wherein the at least one aperture comprises a groove formed longitudinally in the jacket.

7. The medical optical fiber of claim 1, wherein a width of the at least one aperture at a first depth is different than the width of the at least one aperture at a second depth.

8. The medical optical fiber of claim 1, wherein the at least one aperture is a geometric shape.

9. The medical optical fiber of claim 1, wherein the at least one aperture comprises a first aperture and a second aperture.

10. The medical optical fiber of claim 9, wherein the first aperture comprises a first volume and the second aperture comprises a second volume and wherein the first volume is different from the second volume.

11. A method of manufacturing a medical optical fiber, comprising:
    providing a medical optical fiber, the medical optical fiber comprising an optical fiber core and a jacket surrounding the optical fiber core, an end face of the optical fiber core exposed at a distal end of the medical optical fiber;
    forming at least one aperture in the jacket; and
    attaching a protective tip to the distal end of the medical optical fiber, the protective tip to overlap the at least one aperture and to cover the end face of the optical fiber core,
    wherein the protective tip comprises a flattened distal end configured to shatter, fragment, melt, or otherwise open a pathway responsive to laser energy.

12. The method of claim 11, wherein the protective tip substantially contacts an inner surface of the at least one aperture to increase an adhesion between the protective tip and the jacket.

13. The method of claim 11, wherein the medical optical fiber comprises a cladding layer disposed between the optical fiber core and the jacket.

14. The method of claim 11, wherein the at least one aperture comprises a depth that is greater than or equal to a width of the jacket.

15. The method of claim 11, wherein the at least one aperture comprises a radial ring around the jacket.

16. The method of claim 11, wherein the at least one aperture comprises a groove formed longitudinally in the jacket and wherein the groove extends from the distal end of the medical optical fiber.

17. The method of claim 11, wherein a width of the at least one aperture at a first depth is different than a width of the at least one aperture at a second depth.

18. The method of claim 11, wherein the at least one aperture is a geometric shape.

19. The method of claim 11, wherein the at least one aperture comprises a first aperture and a second aperture and wherein the first aperture comprises a first volume and the second aperture comprises a second volume and wherein the first volume is different from the second volume.

20. The method of claim 11, comprising etching or cutting the at least one aperture to form the at least one aperture.

* * * * *